United States Patent [19]

Yamamori et al.

[11] Patent Number: 5,255,133
[45] Date of Patent: Oct. 19, 1993

[54] WAVEFORM PROCESSING SYSTEM AND METHOD FOR RECORDING DIGITAL INFORMATION

[75] Inventors: Kazuyoshi Yamamori, Kawasaki; Tsutomu Tanaka; Tamotsu Jitosho, both of Yokohama, all of Japan

[73] Assignee: Kabushiki Kaisha Toshiba, Kawasaki, Japan

[21] Appl. No.: 702,024

[22] Filed: May 17, 1991

[30] Foreign Application Priority Data

May 17, 1990 [JP] Japan .................. 2-125478

[51] Int. Cl.$^5$ ............................ G11B 5/02; G11B 5/09
[52] U.S. Cl. ............................ 360/67; 360/39
[58] Field of Search .............. 360/39, 40, 46, 67

[56] References Cited

U.S. PATENT DOCUMENTS 4,845,576  7/1989  Kusunoki et al. ............... 360/46 X

OTHER PUBLICATIONS

IEEE Trans. on Magn vol. 18, No. 6 Nov. 1982 "Phase Equalization for Perpendicular Recording"; B. J. Langland pp. 1247-1249.

Primary Examiner—David Mis
Attorney, Agent, or Firm—Cushman, Darby & Cushman

[57] ABSTRACT

A reproduction waveform signal $l$(having a frequency f) containing perpendicular and longitudinal components is reproduced from a recording medium which is magnetized in the vertical direction, thereby recording digital information. The signal is processed through a waveform processing circuit including an operational amplifier having an input side connected to a time constant-setting circuit comprising a capacitor and a resistor, thereby obtaining a processed waveform signal having a constant amplitude and a phase shifted by $2\times(\tan^{-1} 2\pi fA)°$. Bits of the digital information is detected from the processed waveform signal.

17 Claims, 9 Drawing Sheets

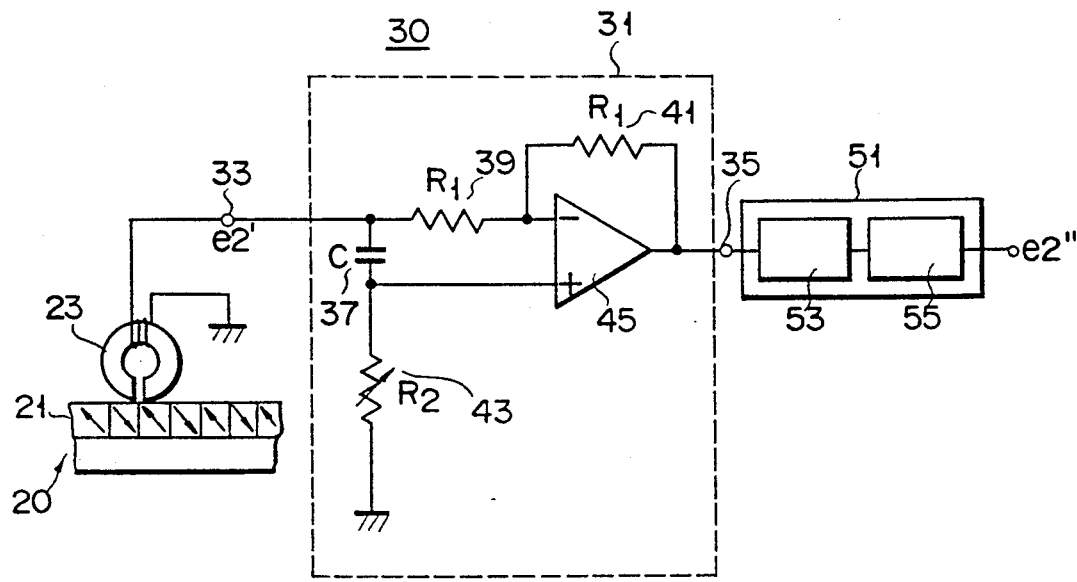
F I G. 5

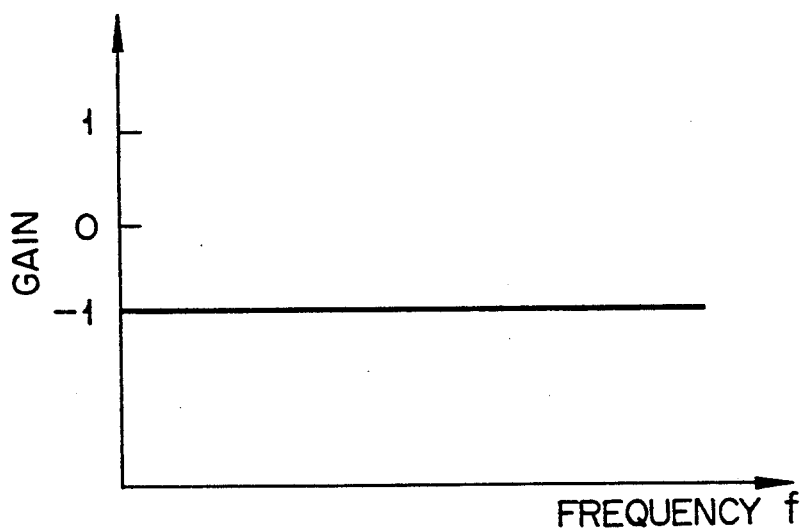
F I G. 6A
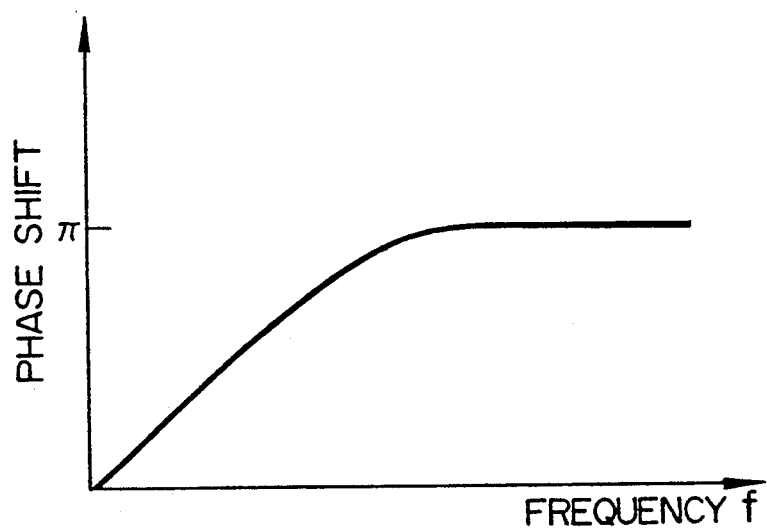
F I G. 6B

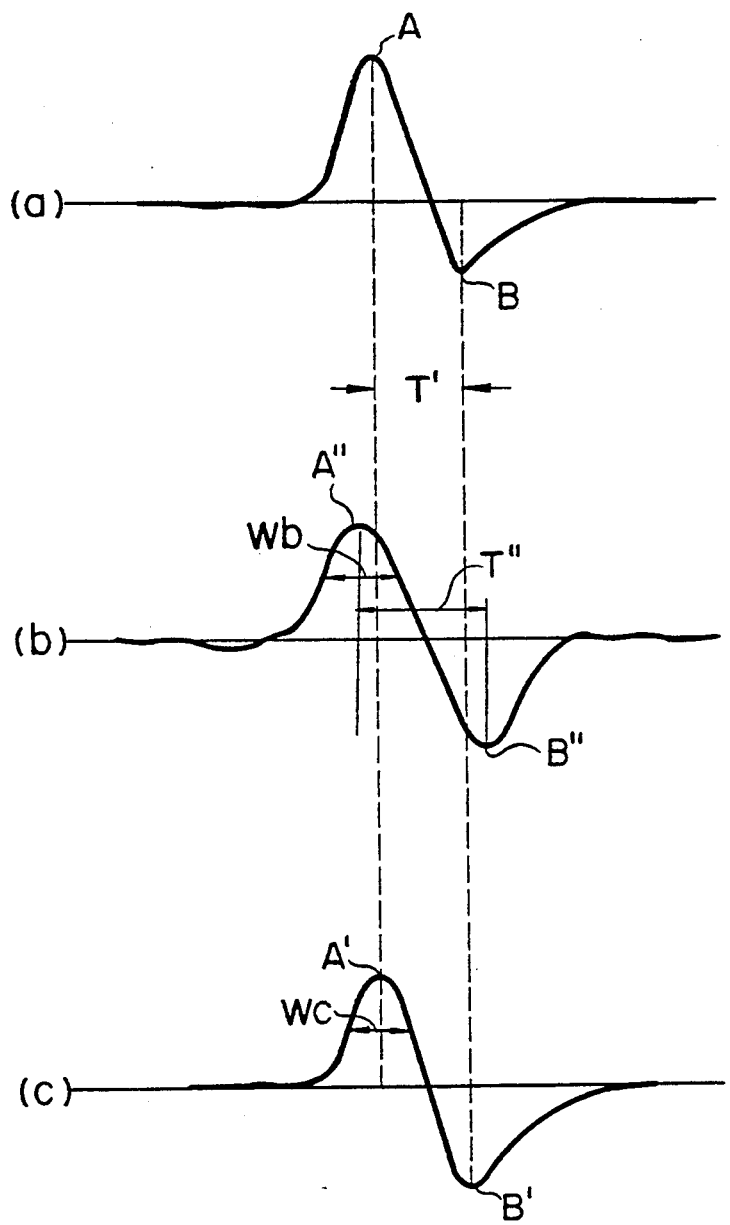
F I G. 8

WAVEFORM PROCESSING SYSTEM AND METHOD FOR RECORDING DIGITAL INFORMATION

BACKGROUND OF THE INVENTION

1. Field of the Invention

This invention relates to a waveform processing system for reproducing magnetically recorded digital information, and its waveform processing method, and particularly to a system and a method of this type which can detect the bits of the digital information on the basis of a reproduction waveform.

2. Description of the Related Art

In recent years, with the spread of personal word processors and personal computers, many floppy disks having a size of e.g. 3.5 inches have arrived on the market as an external memory device for storing digital information.

A longitudinal recording method is applied to such a floppy disk. This disk, which is indicated by reference numeral 10 in FIG. 1, has a magnetic layer 11 provided with longitudinal magnetized blocks 12a and 12b. In this case, a magnetic charge is concentrated in a boundary area between the blocks 12a and 12b since the directions of the magnetization acting in these blocks are opposite to each other. Thus, if reproduction of the recorded information is performed using a ring head 13, a reproduction waveform e1 having a maximum output (b) at the boundary between the blocks 12a and 12b is obtained. Similarly, the waveform e1 has other maximum outputs (a) and (c) at the boundaries between blocks 12a and 12c and between blocks 12b and 12d, respectively (the directions of the outputs, however, are opposite to that of the output obtained between the blocks 12a and 12b). Points at which the direction of magnetization is changed are detected by detecting those peaks (a), (b), and (c) of the reproduction waveform e1 at which the differentiated values are 0 (the points of these peaks are hereinafter called "differentiated value zero-cross points"), thereby detecting the bits of the reproduced information (one peak point = one bit "1").

In the above-described longitudinal recording however, the magnetization is minimum at the magnetic direction-changing point since demagnetizing field is also maximum at the point. This being so, in the case of high-density recording, demagnetizing field will be conspicuous, so that a sufficient reproduction output will not be obtained.

To avoid this, a perpendicular magnetic recording method has been proposed and put into practice in place of the longitudinal method. In the perpendicular magnetic recording, recorded information is reproduced from magnetization acting in the thickness direction of the magnetic layer, as is shown in FIG. 2. In this method, adjacent magnetized blocks 22a–22d of a floppy disk 20 cooperate to strengthen their magnetic forces, which is optimal to reproduce high-density records.

Digital information is recorded in the magnetic layer 21 of the recording medium 20 in its thickness direction, as is shown in FIG. 2. When the information is reproduced by a ring head 23, zero-cross points (a), (b), (c), (d), and (e) of a reproduction waveform e2 are magnetization direction-changing points, so that the bits of the digital information recorded are detected by detecting the zero-cross points (one point = one bit "1").

However, in the perpendicular recording method, since the magnetization formed in the magnetic layer 21 is not completely perpendicular but contains a perpendicular vertical component V and a longitudinal component L. Specifically, as is shown in FIG. 3, the actual waveform reproduced from the magnetic layer 21 differs from the ideal perpendicular waveform e2 shown in FIG. 2, but is identical to that e2' superposed with a longitudinal waveform component upon a perpendicular waveform component.

Thus, the zero-cross points (a'), (b'), (c'), (d'), and (e') of the reproduction waveform e2' deviated from the actual magnetization direction-changing points (a), (b), (c), (d), and (e). If the reproduced zero-cross points (a'), (b'), (c'), (d'), and (e') much deviate from the actual magnetization direction-changing points (a), (b), (c), (d), and (e), the difference in the phase of the reproduction waveform e2' and that of reproduction clock signal will be large, whereby reproduction clock signal will be large, whereby accurate bit detection will not be performed.

If the longitudinal component contained in the reproduction waveform e2' is represented by fH(t), and the perpendicular waveform component fP(t), the following equation (1) is given:

$$fH(t) = -fP(t)[1/(t-\tau)]d\tau... \quad (1)$$

A method was contrived in which the perpendicular component fP(t) was removed from the waveform e2' by using the equation (1), i.e, only the longitudinal component fH(t) was extracted, thereby obtaining a waveform having zero-cross points close to the actual magnetization direction-changing points (a)–(e).

To execute this method, for example, a Hilbert filter 101 shown in FIG. 4 has been used in a waveform processing circuit. The filter 101 comprises an input terminal 103, a delay line 107, a plurality of resistors Ri (i=1, 2, ..., N) connected to the line 107, an operational amplifier 106, and an output terminal 105 connected to the amplifier 106. In the circuit incorporating the Hilbert filter, however, lots of delay time is required for performing accurate Hilbert conversion, and hence a long delay line is required Therefore, providing the Hilbert filter 101 constructed as above in a driving device for driving a floppy disk is not desirable since it makes the apparatus large.

SUMMARY OF THE INVENTION

This invention has been made in consideration of the above-described problem, and aims to provide a waveform processing system which has a simple structure, and hence can be made compact, and accurately detect the bits of recorded digital data on the basis of a reproduction waveform of the data containing perpendicular and longitudinal waveform components, and also to provide a waveform processing method used in the system.

To attain the aim, the waveform processing system of the invention comprises a magnetic head for reproducing digital information recorded in a magnetic recording medium, waveform processing means for processing a reproduction waveform signal output from the magnetic head, the means having predetermined amplitude characteristics and phase characteristics for shifting the phase of the reproduction waveform by $2\times(\tan^{-1}2\pi fA)°$ wherein f denotes the frequency of the reproduction waveform signal, and A a constant value, and detection means for performing bit detection based on a waveform signal output from the waveform processing means.

Further, the waveform processing method of the invention is for detecting bit data from a reproduction waveform obtained from a magnetic recording medium. The method is characterized in that the reproduction waveform is processed so that it will have a constant amplitude, and a phase shifted by $2\times(\tan^{-1}2\pi fA)$.

The reproduction waveform is processed by the above system and method to have a constant amplitude with respect to the frequency f, and a phase shifted (advanced or retarded) by $2\times(\tan^{-1}2\pi fA)°$.

By setting the constant A to a desired value, the phase of the reproduction waveform containing perpendicular and longitudinal waveform components is shifted by a predetermined value, thereby making a differentiated value zero-cross point or a zero-cross point of the waveform accurately correspond to the actual magnetization direction-changing point. Thus, detecting these points enables accurate bit detection.

As described above, in the invention, accurate bit detection can be performed from the reproduction waveform only by adjusting the constant A to an optimal value.

In particular, in a case where the ratio of the harmonic wave component to the fundamental wave component is relatively low, a constant A of the phase-shifting amount $\{2\times(\tan^{-1}2\pi fA)°\}$ of the fundamental wave, which enables the differentiated-value zero cross point of the reproduction waveform to accurately correspond to the actual magnetization-direction changing point, can be determined within a range of about 0 to about $\pi/2$, or about $-\pi$ to about $-\pi/2$.

Similarly, the constant A of $\{2\times(\tan^{-1}2\pi fA)°\}$ which enables the differentiated-value zero cross point to accurately correspond to the actual magnetization-direction changing point, can be determined within a range of about $\pi/2$ to about $\pi$, or about $-\pi/2$ to about 0.

Moreover, if the constant A is set to a value which makes the fundamental wave phase-shifting amount $\{2\times(\tan^{-1}2\pi fA)°\}$ equal to $\pm\pi/2$, the longitudinal component of the reproduction waveform is converted to the perpendicular component, and vice versa.

Additional objects and advantages of the invention will be set forth in the description which follows, and in part will be obvious from the description, or may be learned by practice of the invention The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a block diagram showing a waveform processing system according to a first embodiment of the invention;

FIGS. 6A and 6B are views showing characteristics of a waveform processing circuit employed in the system of FIG. 5;

FIG. 8 is a view showing a waveform processing manner in which 2-bit pattern waveforms are processed;

DETAILED DESCRIPTION OF THE PREFERRED EMBODIMENTS

The invention will now be explained in detail with reference to the accompanying drawings showing embodiments thereof.

FIG. 5 schematically shows a waveform processing system 30 according to a first embodiment of the invention. The system 30 comprises a ring head 23, a waveform processing circuit 31 connected to the ring head 23, and a detection circuit 51 connected to the waveform processing circuit 31.

Figure 1:
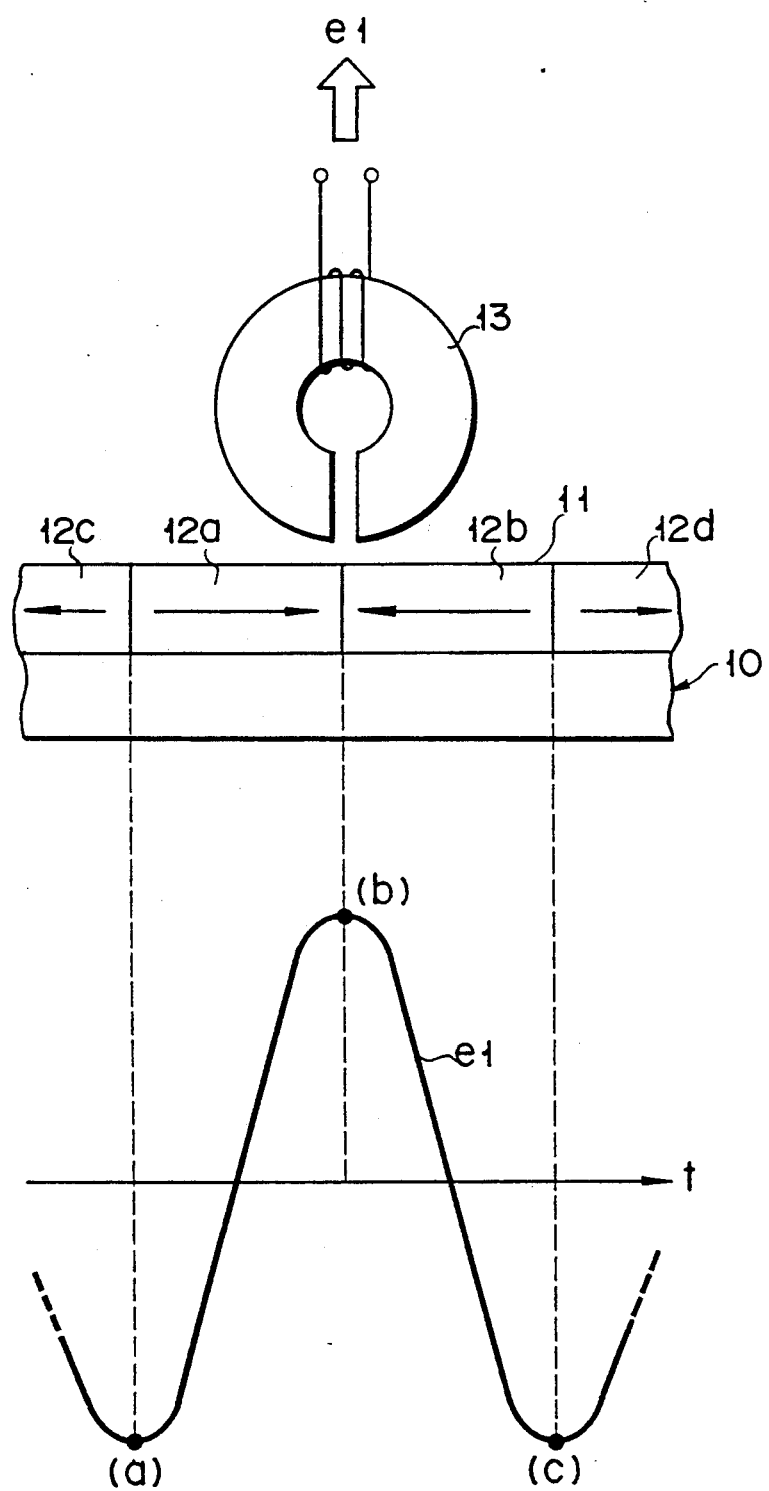
FIG. 1 is a view for explaining a longitudinal magnetization reproduction waveform.
Figure 2:
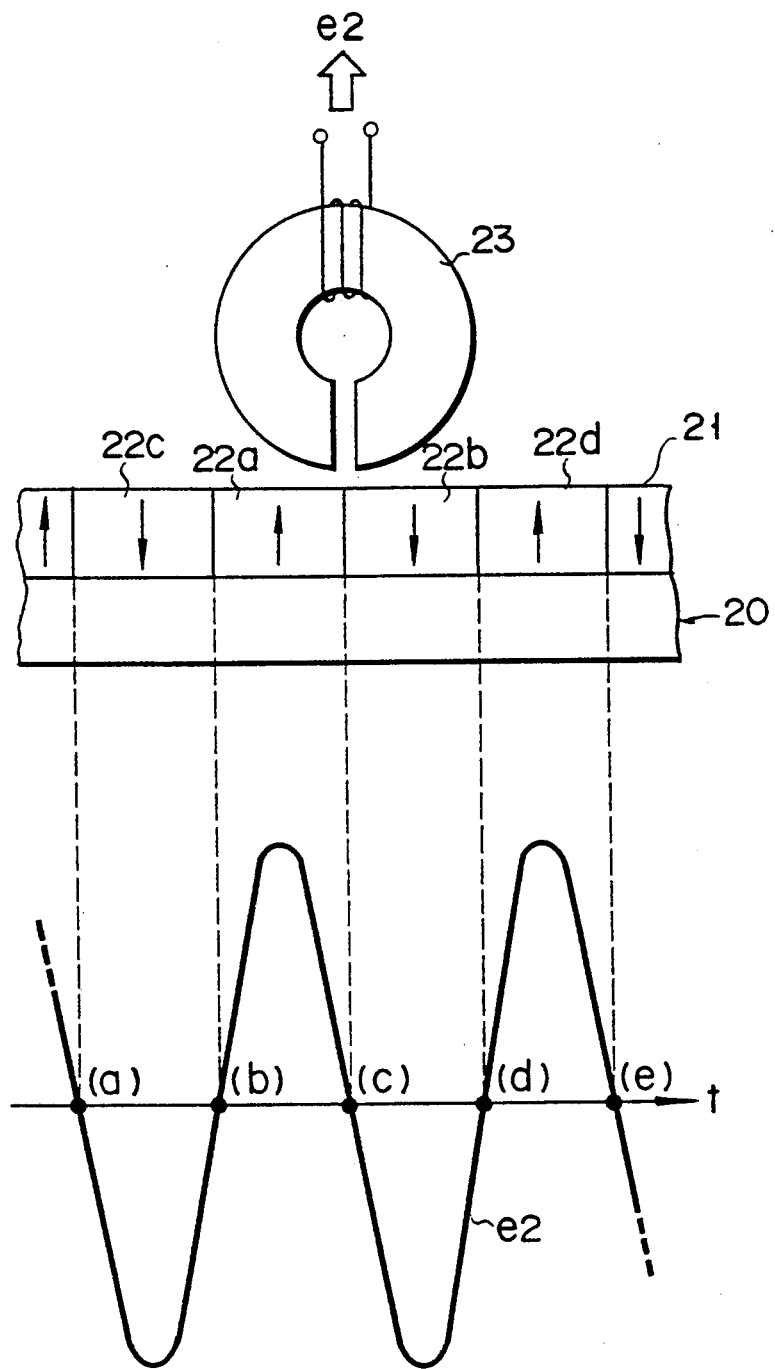
FIG. 2 is a view for explaining a perpendicular magnetization reproduction waveform.
Figure 3:
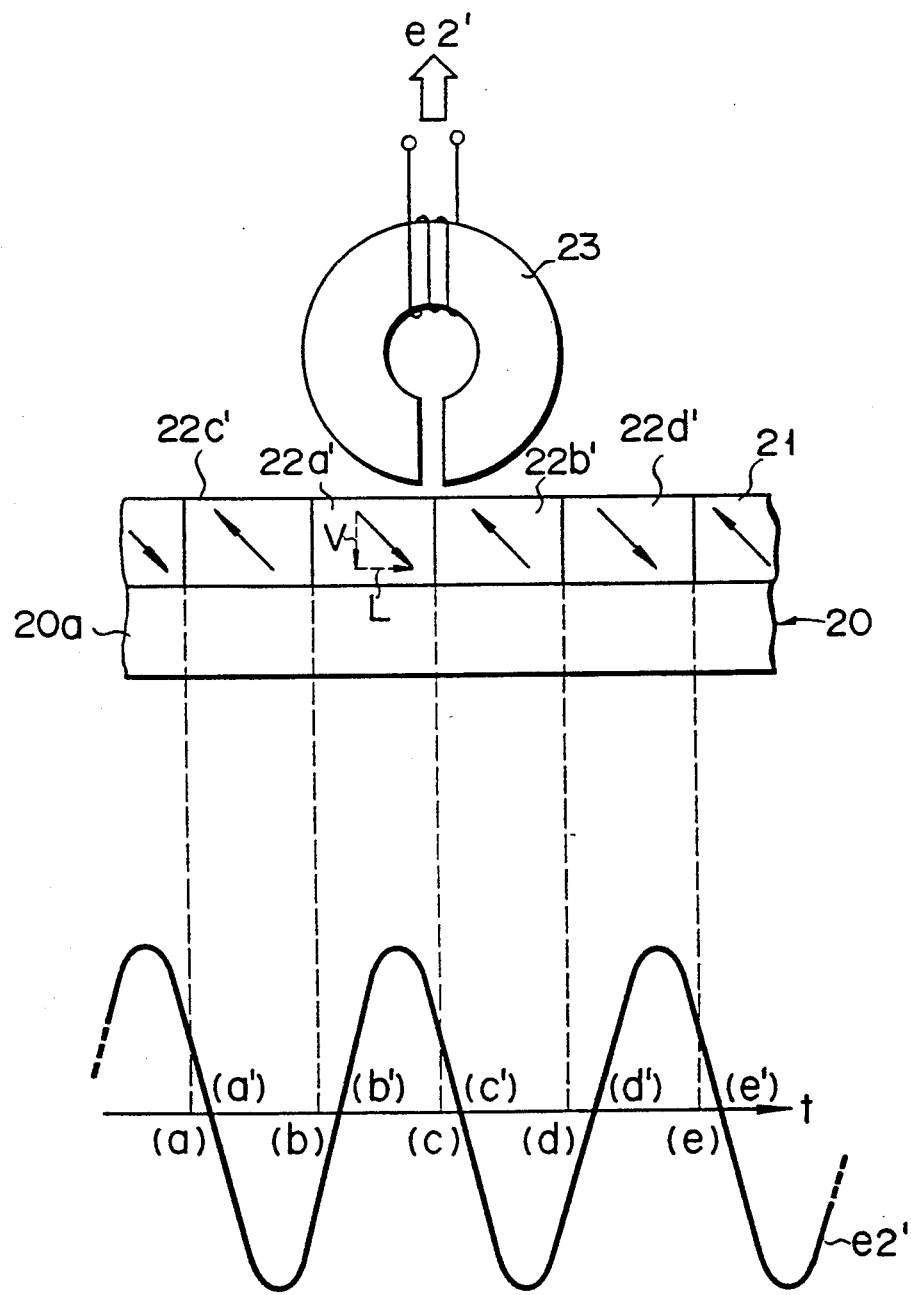
FIG. 3 is a view for explaining a perpendicular magnetization reproduction waveform containing a longitudinal waveform component and a perpendicular waveform component.
Figure 4:
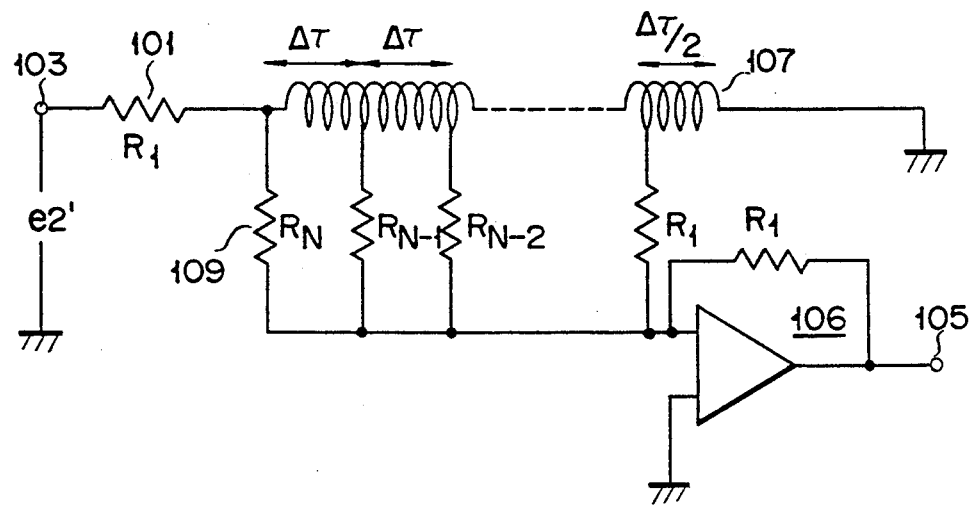
FIG. 4 shows an equivalent circuit diagram of a Hilbert filter used in a waveform processing circuit.

The waveform processing circuit 31 has an input terminal 33 connected to one output terminal of the ring head 23 which has the other terminal grounded, and is supplied, via the terminal 33, with a reproduction waveform signal e2' (FIG. 3) corresponding to a perpendicular magnetization signal recorded in the magnetic layer 21 of the floppy disk body 20. A resistor 39 having a resistance R1 and a capacitor 37 having a capacitance C are connected to the input terminal 33. The other terminal of the resistor 39 and capacitor 37 are connected to inverting and non-inverting input terminals of an operational amplifier 45, respectively. The amplifier 45 has an output terminal connected to an output terminal 35 of the waveform processing means 31 and also connected to the inverting input terminal of itself in a feedback manner via a resistor 41 having a resistance R1. The capacitor 37 has the other terminal grounded via a variable resistor 43 having a variable resistance R2.

The detection circuit 51 comprises a differentiation circuit 53 and a zero-cross comparator 55, and detects the peak of a reproduction waveform processed by the waveform processing circuit 31, thereby detecting the bits of digital in formation recorded on the magnetic layer 21.

The reproduction signal obtained from the ring head 23 is processed by and outputted from the waveform processing circuit 31 to have a constant gain irrespective of its frequency f as shown in FIG. 6A, and to have a phase advanced by $2\times(\tan^{-1}2\pi fA)°$, as shown in FIG. 6B. Here, the constant A is indicated by the product of the resistance R2 of the variable resistor 43 and the capacitor C of the capacitance 37, and the phase characteristics of the waveform processing circuit 31 can be adjusted by changing the resistance R2 to a desired value.

In this embodiment, the constant A, of the $2\times(\tan^{-1}2\pi fA)°$, the resistance R2 is adjusted so that the waveform having a recording density of 10 KFRPI (Flux Reversal Par Inch) change the isolated magnetization transition.

Figure 7:
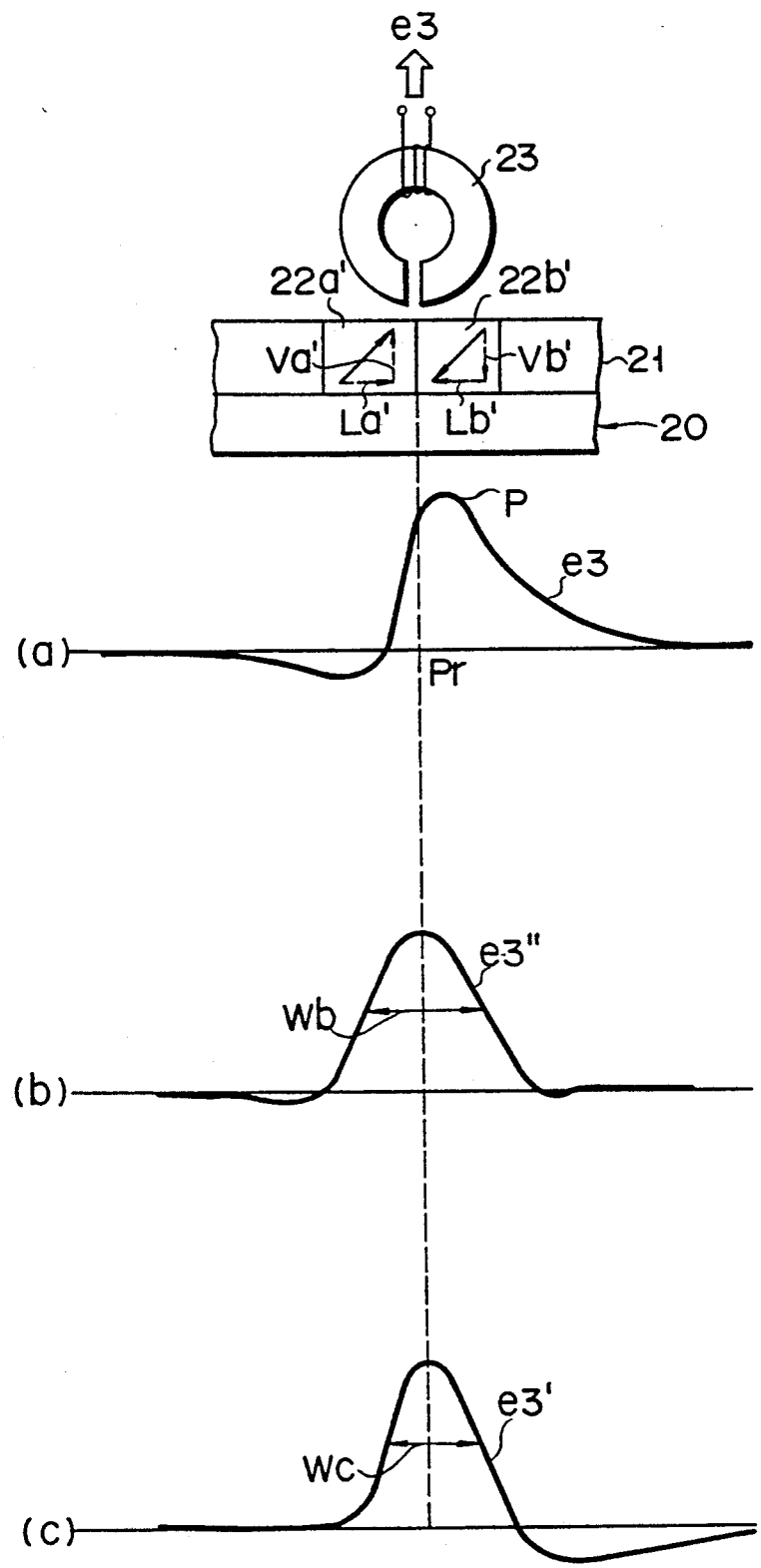
FIG. 7 is a view showing a waveform processing manner in which isolated magnetization transition waveforms are processed.

By using the waveform processing system papered as above, isolated magnetization transition (corresponding to one bit as shown in FIG. 7) recorded in the magnetic disk having a supporting body 20 and a magnetic layer 21 formed on the body 20 and made of a resin and plate-like barium-ferrite magnetic particles diffused therein was reproduced. The magnetic layer 21 had a coercive force Hc of 1400 Oe, and a rectangular hysteresis ratio of 0.75.

(a) of FIG. 7 shows a reproduction waveform e3 including a perpendicular waveform component and a lateral waveform component output from the ring head 23, (b) of FIG. 7 a waveform e3" obtained by processing the reproduction waveform e3' by a practical Hilbert filter, and (c) of FIG. 7 a waveform e3' obtained by processing the reproduction waveform e3 by the waveform processing system shown in FIG. 5.

As is evident from (a) of FIG. 7, the reproduction waveform e3 output from the ring head 23 had a peak P in a position deviated from the actual magnetization direction-changing point Pr, since it was obtained by superposing perpendicular waveform components Va' and Vb' upon longitudinal ones La' and Lb.

On the other hand, the waveforms e3" and e3' output from the simplified Hilbert filter and the waveform processing circuit 31 of the invention were waveforms obtained by extracting those corresponding to longitudinal waveform components La' and Lb' only, so that accurate bit-detection could be performed by detecting a zero-cross point of a differentiated value of each waveform.

Further, as is evident from various experiments' results typically shown in (b) and (c) of FIG. 7, the waveform e3' obtained through the circuit 31 has a half-value width (=a waveform width at a half of the peak value) Wc very smaller than that Wb of the waveform e3" obtained through the Hilbert filter, although the reason is not known yet. The waveform of a small half-value width Wc according to this invention does not much influence upon adjacent waveforms generated before and after, which enables accurate bit detection.

Then, a 2-bit pattern waveform was reproduced from two continuous magnetization direction-changing points recorded in a recording density of 35 KFRPI in the magnetic disk having the magnetic layer comprising plate-like barium ferrite magnetic particles and having a coercive force Hc of 1400 Oe and a rectangular hysteresis ratio of 0.75, and was processed by the waveform processing circuit 31 of the processing system 30.

(a) of FIG. 8 shows a reproduction waveform containing a perpendicular waveform component and a longitudinal waveform component output from the ring head 23 shown in FIG. 5, (b) of FIG. 8 a waveform obtained by processing the reproduction waveform by a Hilbert filter, and (c) of FIG. 8 a waveform obtained by processing the reproduction waveform by the waveform processing system 30 of the invention.

In (a) of FIG. 8, a time period T' elapses between two peak points A, B. In (c) of FIG. 8, a time period substantially equal to T' elapses between two peak points A', B' of the waveform obtained by the system 30. On the other hand, in (b) of FIG. 8, a time period T' longer than T" elapses between two peak points A", B" of the waveform obtained through the Hilbert filter. That is, the waveform obtained by the present invention has peak points less deviated (or shifted) from desired positions than the waveform obtained by the Hilbert filter. In other words, the peak shift of the former waveform is smaller than that of the latter waveform. It is considered that this phenomenon is due to the advantage that the waveform processed through the system 30 has a small half-value width Wc. In particular, the Hilbert filter in which the time period T" between two bits is longer than that T' in the present invention is not suitable for reproducing bits in high density.

Figure 9:
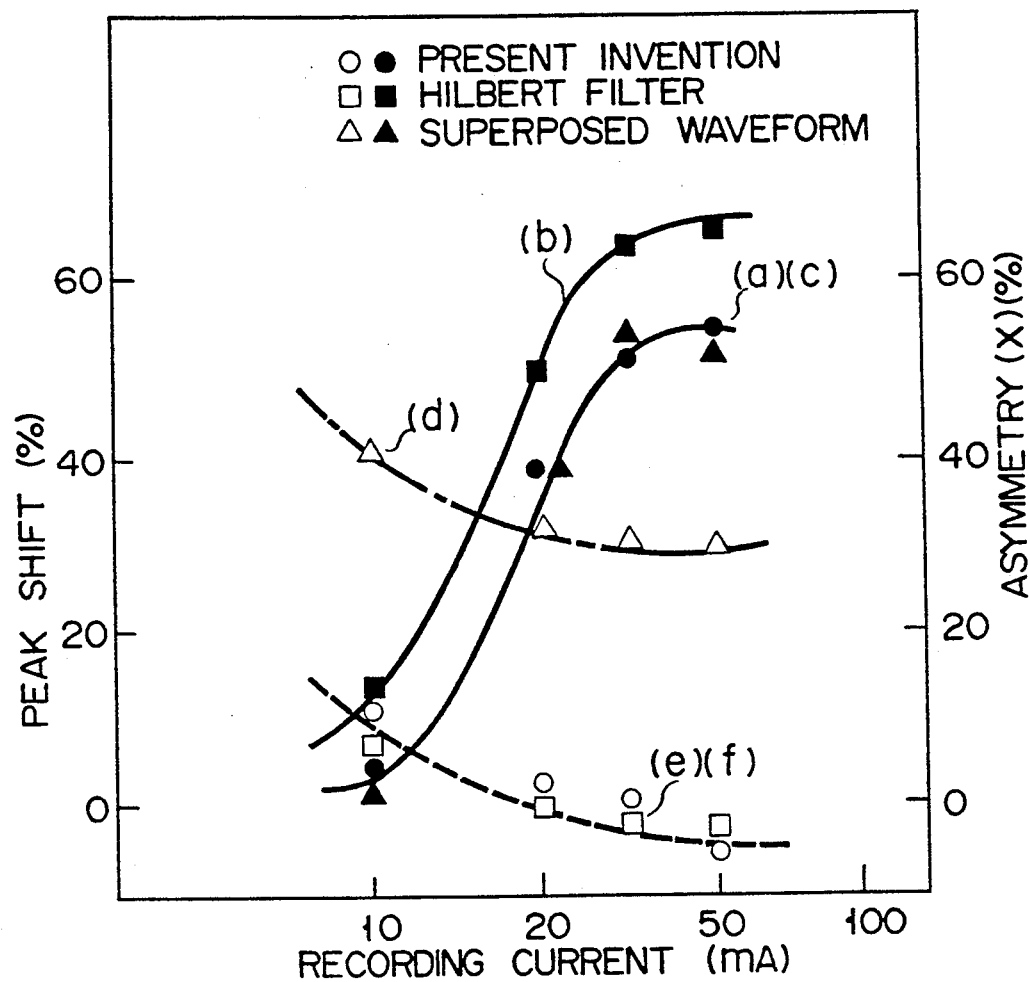
FIG. 9 is a graph showing characteristics of waveforms processed by the invention and a practical Hilbert filter, in which the ordinate indicates a peak shift amount and an asymmetry amount, and the abscissa an amount of a recorded current.

FIG. 9 shows various characteristics of waveforms, in which the ordinate indicates a peak shift and an asymmetry, and the abscissa an amount of a recorded current. Here, the asymmetry amount X is obtained from the formula $X=[(A-B)/(A+B)]\times 100$, where A represents the positive peak value of a reproduction waveform, and B the negative peak value. Further, the peak shift is obtained from the formula $[(T'-T)/0.5\times T]\times 100$, where T represents a bit interval of a recorded two-bit pattern waveform, and T' a peak interval of a reproduction waveform. In FIG. 9, curve (a) indicates the peak shift of the reproduction waveform shown in (a) of FIG. 8, curve (b) that of the waveform shown in (b) of FIG. 8, and curve (c) that of the waveform shown in (c) of FIG. 8. Further, curves (d), (e), and (f) indicate the asymmetry of the waveforms shown in (a), (c), and (b) of FIG. 8, respectively.

As is evident from FIG. 9, in the first embodiment of the invention, the absolute value |A'| of the positive peak value of a waveform is substantially equal to that |B'| of the negative peak value, which means that the waveform has as small an asymmetry as the waveform obtained by the Hilbert filter. Also, the waveform obtained by the system 30 of the invention has a half-value width and a peak shift smaller than those of the waveform obtained by the Hilbert filter.

Thus, first embodiment of the invention can output a waveform which has a very small peak point shift amount and a high degree of symmetry.

As described above, in the first embodiment, the phase of a waveform can be shifted by an optimal value falling to by changing the resistance R2 of the variable resistor 43, thereby making the position of the peak of the waveform correspond to the actual magnetic force direction-changing point. Then, differentiated value zero-cross points are obtained from the waveform thus processed, accurately detecting the bits of recorded information. Further, the system of the first embodiment has a very simple structure and hence a compact size, as compared with a system incorporating a Hilbert filter.

In summary, in the first embodiment, to detect the bits of the recorded information, a reproduction waveform containing a perpendicular waveform component and a longitudinal waveform component is processed so that its differentiated value zero-cross point will correspond to the actual magnetization direction-changing point.

Figure 10:
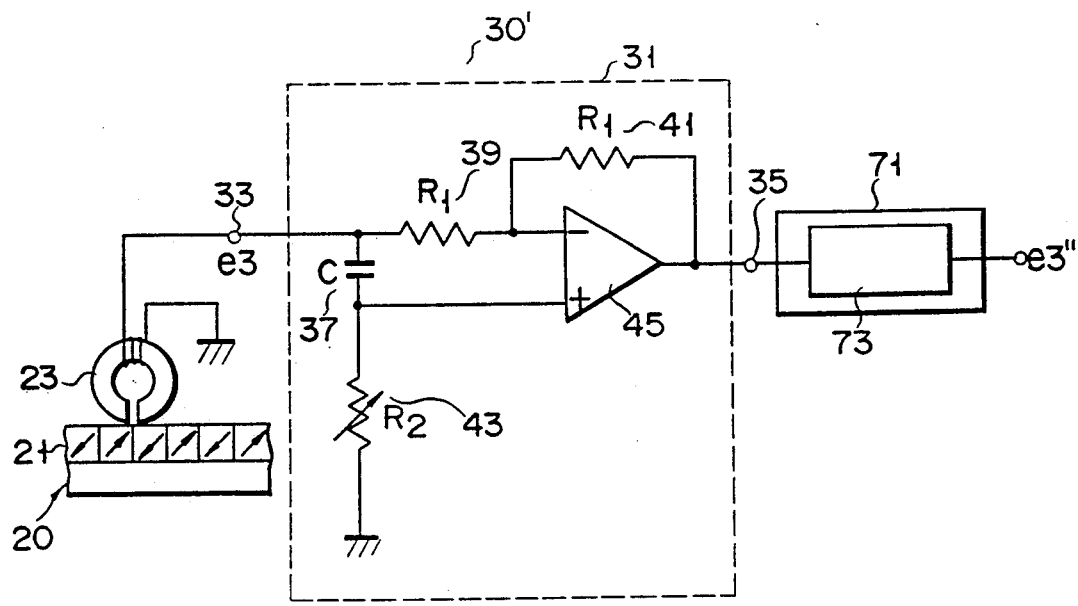
FIG. 10 is a block diagram showing a waveform processing system according to a second embodiment of the invention.
Figure 11:
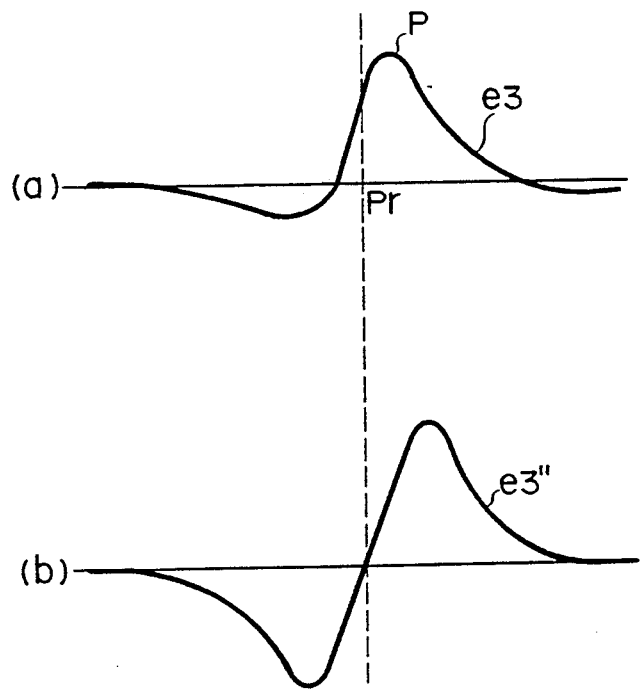
FIG. 11 is a view showing a waveform processing manner in which isolated magnetization transition waveforms processed according to the system of FIG. 10.

Then, a second embodiment of the invention will be explained with reference to FIGS. 10 and 11, in which the reproduction waveform is processed so that its zero-cross point will correspond to the actual magnetization direction-changing point. In FIGS. 10 and 11, components corresponding to those shown in the foregoing figures are denoted by the identical or similar reference numerals, and explanations thereof are omitted.

As is shown in FIG. 10, a waveform processing system 30' of the second embodiment comprises a ring head 23, waveform processing circuit 31 connected to the ring head 23, and detection circuit 71 connected to the processing circuit 31.

The processing circuit 31 has a structure identical to that of the first embodiment. The detection circuit 71 comprises a zero-cross point comparator 75, and detects the zero-cross point of the reproduction waveform processed by the processing circuit 31, thereby performing bit detection.

In the second embodiment, when the single isolated magnetization transition (in FIG. 7) recorded in a barium ferrite magnetic disk having a supporting body and a magnetic layer formed on the body and made of a resin and plate-like barium-ferrite magnetic particles diffused therein was reproduced, a reproduction waveform e3 (shown in (a) of FIG. 11) including a perpendicular waveform component and a longitudinal waveform component was output. The magnetic layer had a coercive force Hc of 1400 Oe and a rectangular hysteresis ratio of 0.75.

The constant A of the advancing degree of $2 \times (\tan^{-1} 2\pi fA)^\circ$, i.e., the resistance R2 was adjusted so that the phase of a fundamental waveform having a recording density of 10KFRPI would advance by a value falling within a range of 0 to $\pi/2$, and that an ideal perpendicular waveform would be obtained.

A waveform e3" as shown in (b) of FIG. 11 was obtained by processing the reproduction waveform e3 (in (a) of FIG. 11) through the waveform processing circuit 31 adjusted as above. As can be understood by comparing (b) of FIG. 11 with (a), the waveform e3" obtained by the second embodiment of the invention has a zero-cross point accurately corresponding to the actual magnetization direction-changing point Pr indicated by the broken line. This means that the system of the second embodiment can perform accurate bit detection.

As explained above, the waveform processing system 30' according to the second embodiment has a simple structure, and can perform accurate bit detection, only by changing the resistance of a resistor incorporated in the system, on the basis of a reproduction waveform containing a longitudinal waveform component and a perpendicular waveform component. Especially, the phase of the reproduction fundamental waveform can be shifted, by changing the resistance, by an optimal value falling within a range of $\pi/2$ to $\pi$ such that its zero-cross point accurately corresponds to the actual magnetization direction-changing point.

Although in the above-described embodiments, a ring head serves as a magnetic head, it is a matter of course that a thin film magnetic head, a vertical magnetic head, etc. can be used instead of the ring head.

Although in the embodiment described above, a particular barium ferrite magnetic disk is used, other barium ferrite disks can be used which have various coercive forces Hc and rectangular hysteresis ratios. Moreover, such a recording medium as a perpendicular recording disk made of Co-Cr thin film can be used in place of the barium ferrite disk.

The systems according to the first and second embodiments of the invention, which have a simple structure and hence can be made compact, can perform accurate bit detection on the basis of a reproduction waveform including a vertical waveform component and a longitudinal waveform component. In the invention, the reproduction waveform is processed to have a small half-value width, whereby the peak point of the waveform can accurately correspond to the actual magnetization direction-changing point only if it is slightly shifted. In summary, the waveform processing system of the invention is optimal for performing bit detection by detecting the peak point(s) of a reproduction waveform output from a magnetic recording medium having a magnetic layer in which magnetization acts in the vertical direction.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A waveform processing system comprising:
   a magnetic head for reproducing digital information recorded in a magnetic recording medium;
   waveform processing means for processing a reproduction waveform signal output from the magnetic head, the means having predetermined amplitude characteristics and phase characteristics for shifting the phase of the reproduction waveform by $2 \times (\tan^{-1} 2\pi fA)^\circ$ wherein f denotes the frequency of the reproduction waveform signal, and A a constant value; and
   detection means for performing bit detection based on a waveform signal output from the waveform processing means.

2. The system according to claim 1, wherein a barium ferrite magnetic recording medium is used as the magnetic recording medium 3. The waveform processing system according to claim 1, wherein the waveform processing means comprises:
   an input terminal for receiving the reproduction waveform signal output from the magnetic head;
   a series constant circuit having a capacitor and a first resistor connected between the input terminal and the earth;
   a second resistor having one end connected to the input terminal and the other end;
   an operational amplifier having an inverting input terminal connected to the other end of the second resistor, a non-inverting input terminal connected to a junction between the capacitor and the first resistor, and an output terminal; and
   a third resistor connected between the output terminal and non-inverting terminal of the operational amplifier.

4. The waveform processing system according to claim 3, wherein the constant A is determined depending upon a resistance of the first resistor.

5. The waveform processing system according to claim 4, wherein that phase-shifting amount of the reproduction waveform signal which falls within a range of 0 to $\pi/2$ is determined by a resistance of the first resistor.

6. The waveform processing system according to claim 5, wherein the detection means includes a differentiation circuit for differentiating the waveform processed by the waveform processing means, and means for detecting a zero-cross point of an output from the differentiation circuit.

7. The waveform processing system according to claim 4, wherein that phase-shifting amount of the reproduction waveform signal which falls within a range of $\pi/2\pi$ is determined by a resistance of the first resistor.

8. The waveform processing system according to claim 7, wherein the detection means includes means for detecting a zero-cross point of the waveform processed by the waveform processing means.

9. The waveform processing system according to claim 5, wherein the magnetic recording medium is magnetized in the vertical direction, thereby storing the digital information.

10. The waveform processing system according to claim 7, wherein the digital information recorded in the magnetic recording medium is reproduced as a waveform containing a vertical component and a lateral component.

11. The waveform processing system according to claim 1, wherein the magnetic head is a ring head.

12. A waveform processing method of detecting data from a reproduction waveform obtained from a magnetic recording medium, wherein the reproduction waveform is processed so that it will have a constant amplitude, and a phase shifted by $2\times(\tan^{-1}2\pi fA)°$ wherein f denotes the frequency of the reproduction waveform, and A a constant value.

13. The method according to claim 12, wherein a barium ferrite magnetic recording medium is used as the magnetic recording medium.

14. The waveform processing method according to claim 12, wherein that phase-shifting amount of the reproduction waveform signal which falls within a range of 0 to $\pi/2$ is determined by the constant A.

15. The waveform processing method according to claim 12, wherein that phase-shifting amount of the reproduction waveform signal which falls within a range of $\pi/2$ to $\pi$ is determined by the constant A.

16. The waveform processing method according to claim 14, wherein a point at which the processed waveform has a peak is detected, thereby detecting bit data.

17. The waveform processing method according to claim 15, wherein a point at which the processed waveform crosses the abscissa is detected, thereby detecting bit data.

* * * * *